United States Patent [19]

Kagata

[11] Patent Number: 4,824,504
[45] Date of Patent: Apr. 25, 1989

[54] METHOD OF MANUFACTURING TRIMMINGS AND GOODS

[75] Inventor: Sadatoshi Kagata, Ayase, Japan

[73] Assignee: Ikeda Bussan Co, Ltd., Ayase, Japan

[21] Appl. No.: 137,364

[22] Filed: Dec. 23, 1987

[30] Foreign Application Priority Data

Dec. 24, 1986 [JP] Japan .................. 61-306397

[51] Int. Cl.$^4$ .................. B29C 49/04; B29C 49/48
[52] U.S. Cl. .................. 156/216; 156/245; 264/295; 264/296; 264/511; 264/515; 264/516
[58] Field of Search ............ 264/511, 512, 514, 515, 264/516, 527, 536, 295, 296; 156/216, 245

[56] References Cited

U.S. PATENT DOCUMENTS 3,328,498  6/1967  Cheney .................. 264/527

FOREIGN PATENT DOCUMENTS 118436 of 1984 Japan .
139415 of 1986 Japan .

*Primary Examiner*—James Lowe
*Assistant Examiner*—Neil Michael McCarthy
*Attorney, Agent, or Firm*—Foley & Lardner, Schwartz, Jeffery, Schwaab, Mack, Blumenthal & Evans

[57] ABSTRACT

A method of manufacturing interior trimmings characterized in that an integral portion is extended from the circumferential rim of a skin material in die half, that the substantially whole of this extended portion is sandwiched and fixed between a holder member and that face of the die half which is combined with that of the other die half, that the paired die halves are thus combined with each other to mold a resin body, and that when the resin body thus molded is divided, the extended portion of the skin material is folded round the divided end of its corresponding resin body and fixed to the inner face of this resin body.

6 Claims, 4 Drawing Sheets

METHOD OF MANUFACTURING TRIMMINGS AND GOODS

BACKGROUND OF THE INVENTION

1. Field of the Invention

The present invention relates to a method of manufacturing interior trimmings and more particularly it relates to those molded by blow molding with the outer surface of their thus molded and divided body covered by a skin material.

2. Prior Art

Interior trimmings and goods such as seat-back garnishes for cars and household containers are decorated by covering the outer surface of a resin-molded body, which serves as a core, with a skin material. An example of the methods for manufacturing the interior trimmings of this kind according to the blow molding method is disclosed by the previously-opened Japanese Patent Application Sho 59-118436 which was filed before the present invention. FIG. 1 is a sectional view of the prior art showing a die employed by this method and a product thus molded.

A pair of blow molding die halves (a) are set so in size and shape as to produce plural interior trimmings. A skin material (b) is arranged on the inner faces of the cavity formed by the die halves (a) and forced thereto by making the cavity vacuum through suction holes (d). When a parison is extruded into the die halves (a) under this state and pressurized air is injected inside the parison, the skin material (b) is combined integral with the outer face of a resin body (c) molded by the parison to thereby form a molded product (e). When this molded product (e) is picked up from the die halves (a) and cut off along lines A—A and B—B in FIG. 2, two interior trimmings are produced at the same time, thereby enhancing the production cycle.

In the case of interior trimmings thus molded, that end face of the skin material (b) which is formed by the cut-off process forms a same face together with that of the molded resin body (c), thereby causing the cut-off end face to appear not to be good. In addition, the skin material (b) is easy to peel off from the molded resin body (c) at the cut-off end-face. The cut-off end face must be therefore shielded independently, thereby making the treatment for the cut-off end face of the skin material more troublesome.

Further, the skin material (b) which is arranged on the inner faces of the die halves (a) is forced onto the inner faces of the cavity formed by the die halves (a) by vacuum molding, as described above. In this case, however, the fixing of the skin material (b) becomes unstable at the rim portion thereof and the skin material (b) must be therefore fixed to the die halves (a) at plural rim portions thereof by means of two-sided binding tape, for example.

SUMMARY OF THE INVENTION

The present invention provides a method comprising arranging a skin material freely detachably on inner faces of a cavity formed by a pair of blow molding die halves, combining the skin material integral with a resin body molded by a parison which is extruded into the die halves and expanded by pressurized air blown in, and dividing the thus-molded product along parting lines to provide plural interior trimmings. An extended portion is formed at the circumferential rim portion of the skin material arranged in the die half, and is held and fixed on that face of the die half, which is combined with that of the other die half, by means of a holder member. Molding is carried out under the condition that these die halves are combined with each other. A molded body is divided into plural products and the extended portion of a product is folded and fixed round its divided end portion.

The blow molding is carried out, fixing substantially all of the extended portion of the skin material on that face of the die half, which is combined with that of the other die half, by means of the holder member, and the extended portion of the skin material is thus left out of contact with the molded resin body of the parison. When the molded resin body is divided along this extended portion of the skin material and this extended portion of the skin material is folded and fixed around the divided end of the molded resin body, the divided end of the molded resin body can be coated by the skin material, thereby enabling the product to have an improved appearance. In addition, independent parts are unnecessary to treat the divided end of the product, thereby making the manufacturing cost lower. Further, the extended portion of the skin material can be easily attached to the die half by the holder member.

An object of the present invention is therefore to provide a method of manufacturing interior trimmings each made by coating the outer surface of a resin body molded according to the blow molding method and divided, with a skin material wherein treatment for the end of each of these interior trimmings can be made easier and at a lower cost.

Another object of the present invention is to provide a method of manufacturing interior trimmings wherein the divided end of the molded resin body can be coated by its skin material without using any independent parts.

A further object of the present invention is to provide a method of manufacturing interior trimmings wherein the skin material can be more easily attached to inner faces of blow molding die halves.

These and other objects as well as merits of the present invention will become apparent from the following detailed description with reference to the accompanying drawings.

DETAILED DESCRIPTION OF THE PREFERRED EMBODIMENT

An example of the method for manufacturing interior trimmings according to the present invention will be described in detail with reference to FIGS. 3 through 8 in which the present invention is applied to manufacturing back-garnishes attached, as interior trimmings, to back-sides of seat backs in cars.

Figure 1:
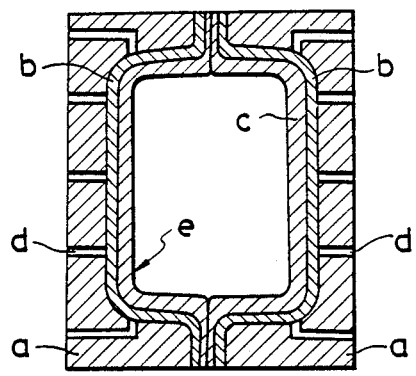
FIG. 1 is a sectional view showing an example of the conventional blow molding method by which a skin material is combined integral with a resin body molded by a parison.
Figure 2:
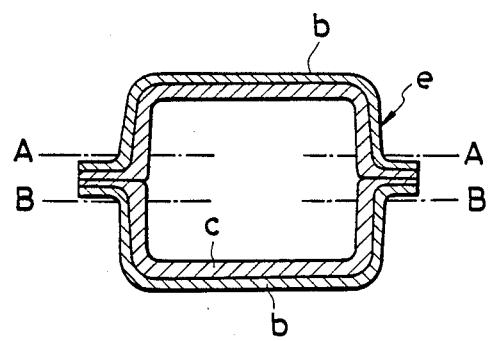
FIG. 2 is a sectional view showing the process in which interior trimmings are formed from the product molded according to the blow molding method shown in FIG. 1.
Figure 3:
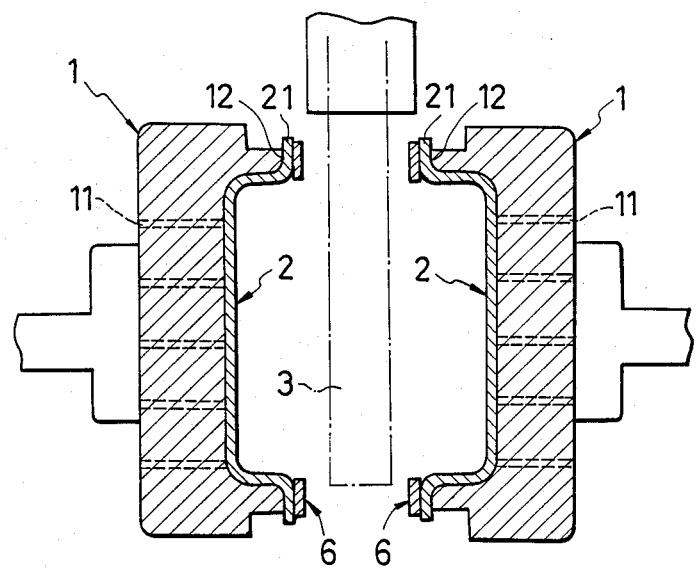
FIG. 3 is a sectional view showing the relationship between the skin material and blow molding die halves according to the present invention.

FIG. 3 shows the relationship between blow molding die halves and a skin material. Numeral 1 represents a pair of die halves which are moved to an opened or closed state by the driver means, numeral 2 the skin material arranged on the inner faces of a cavity formed by the paired die halves 1, and numeral 3 a parison extruded through the extruder.

The size of the die halves 1 and the shape of the cavity are determined so that two predetermined back-garnishes 3 can be produced when a resin body 4 molded from the parison 3 is divided substantially along parting lines. The skin material 2 is arranged on the inner faces of the cavity formed by the die halves 1 and forced thereto when suction is carried out through suction holes 11. The skin material 2 has a size which meets the inner faces of the cavity formed by the die halves 1, and it is provided with an integral portion 21 extending from its circumferential rim to cover that face 12 of the die half which is projected continuously from the circumferential rim of the cavity to correspond to that of the other die half. A sheet of vinyl chloride, cloth material and the like can be used as the skin material 2. Further, a damping material such as urethane foam may be stuck to the back of cloth material, for example.

Figure 4:
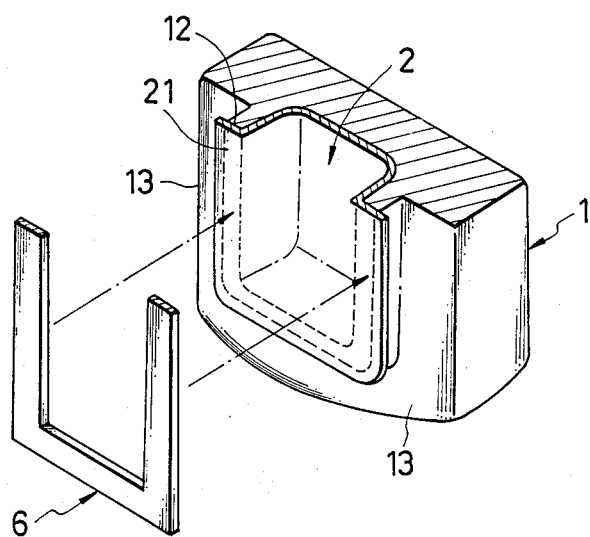
FIG. 4 is a perspective view showing the process in which the skin material is fixed at the rim portion thereof.
Figure 5:
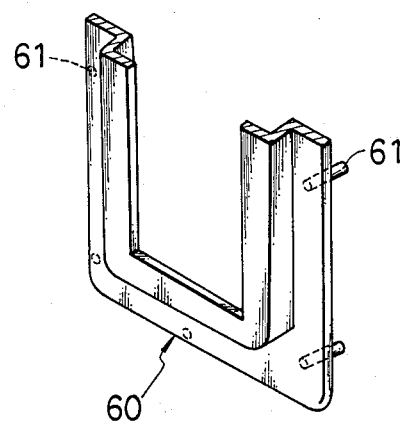
FIG. 5 is a perspective view showing a holder member used to fix the rim portion of the skin material in another fashion.

The extended portion 21 of the skin material 2 is sandwiched and fixed between the face 12 of the die half 1 and a holder member 6, so that the outer face of the extended portion 21 can be wholly covered by the holder member 6. FIG. 4 shows how the extended portion 21 of the skin material 2 is fixed. The holder member 6 is a frame made by a magnetic member, which has been partially or wholly magnetized, and shaped to meet the face 12 of the die half 1. It is magnetically attracted to the face 12 of the die half 1 with the extended portion 21 of the skin material 2 interposed between them, when the skin material 2 is forced onto the inner faces of the cavity formed by the die halves 1. As shown in FIG. 5, it may be arranged that the holder member 6 is made by an iron plate or the like and shaped to cover the face 12 and a stepped portion 13 of the die half 1 and that it is provided with plural pins 61 projected from its inner face and fitted into their corresponding holes in the stepped portion 13 of the die half 1.

Figure 6:
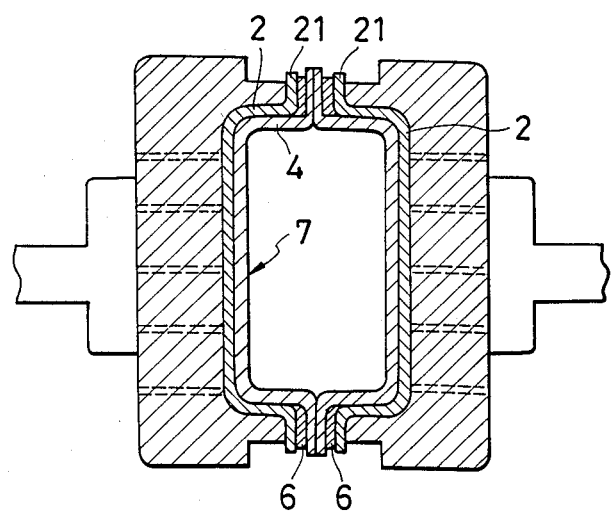
FIG. 6 is a sectional view showing the process in which the skin material is combined integral with the resin body molded by the parison using the die halves.
Figure 7:
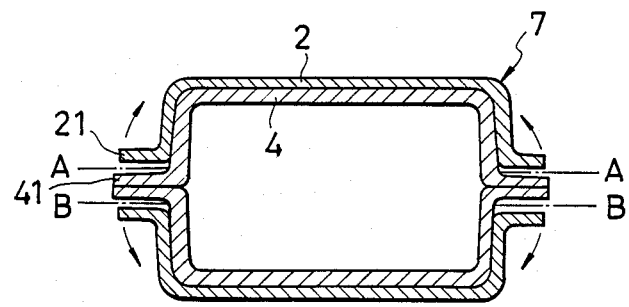
FIG. 7 is a sectional view showing a molded product picked up from the die halves.
Figure 8:
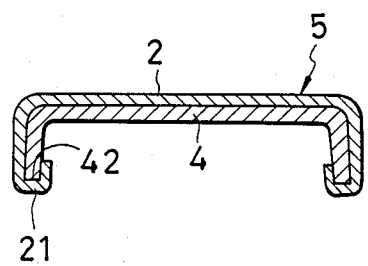
FIG. 8 is a sectional view showing how the divided end of an interior trimming obtained by dismantling the molded product is treated.

When the die halves 1 in which the skin material 2 has been arranged are moved to combine with each other and pressurized air is blown into the parison, the skin material 2 is made integral to the outer surface of the resin body 4 molded from the parison 3 to thereby provide a molded product 7, as shown in FIG. 6. When the die halves 1 are moved to separate from each other and the holder members 6 are released from the die halves 1 after the die halves 1 are cooled, the molded product 7 can be released from the die halves 1, as shown in FIG. 7. The extended portions 21 of the skin material 2 are not in contact with ends 41 of the resin bodies 4 in this case but are spaced from them, because the extended portions 21 have been covered by the holder members 6, respectively. When the molded product 7 is divided substantially along lines A—A and B—B in FIG. 7, therefore, there can be provided two back-garnishes 5 each having a shape which meets the inner face of the die half 1. The extended portion 21 of the skin material 2 left free can be folded round a divided end 42 of the resin body 4 and fixed to the inner face of the resin body 4 by a binding agent or tacker. In short, the rim end of the back-garnish 5 can be covered by the extended portion 21 of the skin material 2, thereby making it unnecessary to use an independent member for the divided end of the resin body 4, enhancing its appearance, and preventing the skin material from peeling off from the resin body at their divided ends.

The interior trimmings are not limited to the above-described back-garnishes but they may be those used as door trimmings, arm rests and the like for cars and used as household containers. Further, the die halves may be shaped to produce different interior trimmings when the resin body molded is divided.

Although the present invention has been described citing some preferred embodiments thereof, it should be understood that various changes and modifications can be made without departing from the spirit and scope of the present invention.

I claim:

1. A method of manufacturing interior trimmings comprising the steps of:
   separating a pair of blow molding die halves from each other, each of said blow molding die halves comprising a concave central cavity portion surrounded by a circumferential rim portion extending outwardly therefrom;
   setting a skin material on an inner face of each of said cavity portions in a manner such that an integral portion of the skin material extends over the circumferential rim of each cavity portion;
   covering an outer face of each extended portion of the skin material with a holder member;
   extruding a parison between the separated die halves;
   combining the die halves with each other;
   blowing pressurized air into the parison to mold a resin body against said skin material to thereby form a molded product;
   separating the die halves from each other after the die halves have cooled;
   removing the holder member from against each extended portion of the skin material thereby defining a space between each extended portion of the skin material and the resin body;
   removing the molded body from the die halves;
   dividing the molded product by cutting said molded product along the space formed between said resin body and each extended portion of said skin material; and
   folding each extended portion of the skin material around a cut end of the resin body and fixing each extended portion of said skin material thereto.

2. A method of manufacturing interior trimmings according to claim 1, wherein the skin material is forced into an inner face of the central cavity portion by vacuum-sucking through holes.

3. A method of manufacturing interior trimmings according to claim 1 wherein the holder member is a frame made by a magnetic member.

4. A method of manufacturing interior trimmings according to claim 1 wherein the holder member is a frame provided with pins.

5. A method of manufacturing interior trimmings according to claim 1 wherein the extended portion of the skin material is fixed to the cut end of its corresponding resin body by means of a binding agent.

6. A method of manufacturing interior trimmings according to claim 1 wherein the extended portion of the skin material is fixedly tacked to the cut end of its corresponding resin body by means of a tacker.

* * * * *